(12) United States Patent
Ayers

(10) Patent No.: US 12,540,410 B2
(45) Date of Patent: Feb. 3, 2026

(54) METHOD AND APPARATUS FOR ENERGY EFFICIENT ELECTROCHEMICAL PRODUCTION OF HYDRIDE GASES

(71) Applicant: Ayers Group, LLC, Princeton, NJ (US)

(72) Inventor: William M. Ayers, Princeton, NJ (US)

(73) Assignee: Ayers Group, LLC, Princeton, NJ (US)

( * ) Notice: Subject to any disclaimer, the term of this patent is extended or adjusted under 35 U.S.C. 154(b) by 810 days.

(21) Appl. No.: 17/333,864

(22) Filed: May 28, 2021

(65) Prior Publication Data

US 2022/0025528 A1 Jan. 27, 2022

Related U.S. Application Data

(63) Continuation of application No. PCT/US2019/063735, filed on Nov. 27, 2019.

(60) Provisional application No. 62/772,531, filed on Nov. 28, 2018.

(51) Int. Cl.
| | |
|---|---|
| *C25B 9/40* | (2021.01) |
| *C25B 1/01* | (2021.01) |
| *C25B 11/081* | (2021.01) |
| *C25B 15/02* | (2021.01) |

(52) U.S. Cl.
CPC ............... *C25B 9/40* (2021.01); *C25B 1/01* (2021.01); *C25B 9/43* (2021.01); *C25B 9/47* (2021.01); *C25B 11/081* (2021.01); *C25B 15/02* (2013.01)

(58) Field of Classification Search
CPC .... C25B 9/40; C25B 9/43; C25B 9/47; C25B 1/04; C25B 11/037
See application file for complete search history.

(56) References Cited

U.S. PATENT DOCUMENTS

| | | | | |
|---|---|---|---|---|
| 959,730 A | * | 5/1910 | Gabriel | C25B 15/08 423/183 |
| 3,109,789 A | * | 11/1963 | Miller | C25B 1/00 204/251 |
| 3,312,610 A | * | 4/1967 | Miller | C25B 1/00 204/266 |
| 4,016,044 A | * | 4/1977 | Fresnel | C12Q 1/001 435/813 |
| 5,158,656 A | * | 10/1992 | Ayers | C25B 1/00 205/348 |
| 5,474,659 A | * | 12/1995 | Cadet | C25B 1/00 204/252 |
| 2013/0146446 A1 | * | 6/2013 | Wang | C25B 9/40 204/230.2 |
| 2014/0008240 A1 | * | 1/2014 | Machado | C25B 15/02 204/266 |

* cited by examiner

*Primary Examiner* — Ciel P Contreras
(74) *Attorney, Agent, or Firm* — Woodard, Emhardt, Henry, Reeves & Wagner, LLP

(57) ABSTRACT

Described are electrochemical systems and methods for the generation of high purity hydride gases, e.g. for delivery to semiconductor fabrication reactors.

24 Claims, 6 Drawing Sheets

METHOD AND APPARATUS FOR ENERGY EFFICIENT ELECTROCHEMICAL PRODUCTION OF HYDRIDE GASES

REFERENCE TO RELATED APPLICATION

This application is a continuation of PCT/US2019/063735, filed Nov. 27, 2019, which claims the benefit of priority to U.S. Patent Application No. 62/772,531 entitled "Method and Apparatus for Energy Efficient Electrochemical Production of Hydride Gases" filed on Nov. 28, 2018, which is hereby incorporated herein by reference in its entirety.

BACKGROUND

Field

Aspects of the present disclosure relate generally to electrochemical reactor systems for the generation of Group IV and V volatile hydrides. Beneficial reactor systems can produce large quantities of high purity hydride gas per minute of operation with high energy efficiency per kilogram of gas produced, in a semi-continuous or continuous manner so as to provide consistent high purity hydride gas for large scale semiconductor manufacturing.

Discussion

The production of semiconductor lasers, such as vertical cavity lasers (VCSEL), light emitting diodes (LED), compound semiconductor solar cells, and high frequency microwave and millimeter wave solid state devices require hydride gas such as arsine, germane, stibine, and phosphine for their fabrication. VCSEL lasers include both gallium arsenide (GaAs) and indium gallium arsenide (InGaAs) layers in their fabrication. Increased commercial production of VSCEL lasers and GaAs compound semiconductor photovoltaic or solar cells require large quantities of the hydride gas arsine for their production to meet the market demand for these products. The incorporation of VCSEL lasers for facial recognition in cell phones and worldwide demand for high efficiency compound solar cells has greatly increased the need for hydride gases.

Hydride gases are pyrophoric and toxic if breathed in at the parts per million level (U.S. OSHA P.E.L. limits). Providing such hydride gases in commercial high pressure compressed gas cylinders is dangerous because of the hazards and liabilities while transporting, handling, and storing the gas. The United States Environmental Protection Agency (EPA) has declared that storing more than 100 pounds of arsine gas at a semiconductor manufacturing facility constitutes a catastrophic risk to their employees and surrounding population (EPA TPQ Limits, 2012). Compressed gas cylinders contain only a few pounds of arsine. Hence, to not violate the EPA limit, large semiconductor manufacturers must schedule delivery of arsine cylinders and frequently change out those gas cylinders to meet production needs. Electrochemical generation of hydride gases at the semiconductor manufacturer's plant provides substantial advantages over purchasing the hydride gas cylinders including elimination of the liabilities of handling and storing those cylinders.

In the field of electrochemical hydride generation, W. M. Ayers in U.S. Pat. No. 5,186,656, shows the use of a gas tight, sealed packed bed electrochemical reactor. Once the cathode source material in the sealed reactor cell is consumed, the cell must be purged of the toxic hydride gas and then opened to add new hydride source material as well as replace the anode material and electrolyte. W. M. Ayers in U.S. Pat. Nos. 5,925,232, and 6,080,297 discloses an apparatus to maintain constant composition of the hydride gas generated in a sealed electrochemical cell. The quantity of hydride gas produced with the prior art was limited to source material initially sealed in the reactor cell. Another limitation to the enclosed cells is an increase in the cell voltage over time due to anode by-products in the electrolyte that coat the cathode bed. This increase in voltage increases the electrical power required to produce the gas, decreases the hydride concentration, and decreases the energy efficiency of hydride gas production (watt-hours per kilogram of gas produced). To further understand these limitations, the details of an enclosed cell operation are described below.

The hydride gases, arsine, stibine, germane, and phosphine, can be electrochemically generated with the following cathode reactions:

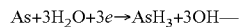

$As + 3H_2O + 3e \rightarrow AsH_3 + 3OH^-$

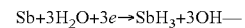

$Sb + 3H_2O + 3e \rightarrow SbH_3 + 3OH^-$

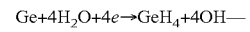

$Ge + 4H_2O + 4e \rightarrow GeH_4 + 4OH^-$

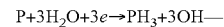

$P + 3H_2O + 3e \rightarrow PH_3 + 3OH^-$

In addition to these elemental hydride cathode materials, such as arsenic, Porter in U.S. Pat. No. 4,178,244 discloses electrochemical reduction of a dissolved arsenic salt in an electrolyte to produce arsine.

At the anode, a reaction is preferred that does evolve a contaminating by-product gas such as oxygen. For example, molybdenum or tungsten anodes can be oxidized to soluble ionic species that dissolve in the electrolyte. Likewise, soluble electrolyte redox couples such as $MnO_2/MnO_3$ or $Co(OH)_2/CoOH_3$ can be oxidized without gas evolution. Other anode reactions include the oxidation of aqueous solutions of hydrazine or oxidation of hydrogen gas.

The hydrogen gas oxidation electrochemical reaction in alkaline solutions is:

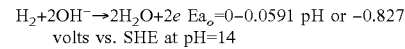

$H_2 + 2OH^- \rightarrow 2H_2O + 2e$  $Ea_o = 0 - 0.0591$ pH or $-0.827$ volts vs. SHE at pH=14

Combining this anode reaction with arsenic reduction as the cathode reaction provides an overall reaction:

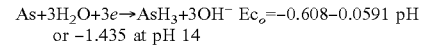

$As + 3H_2O + 3e \rightarrow AsH_3 + 3OH^-$  $Ec_o = -0.608 - 0.0591$ pH or $-1.435$ at pH 14 with

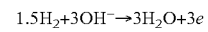

$1.5H_2 + 3OH^- \rightarrow 3H_2O + 3e$ to yield:

$As + 1.5H_2 = AsH_3$

The overall equilibrium reaction voltage of is:

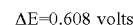

$\Delta E = 0.608$ volts

The overall reaction illustrates that no additional water or electrolyte needs to be added to the initial electrolyte since the anode reaction provides the water required by the cathode reaction and the cathode reaction provide the $OH^-$ anion required by the anode reaction.

In addition to these cell reactions, hydrogen evolution can compete with arsine evolution at the cathode:

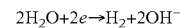

$2H_2O + 2e \rightarrow H_2 + 2OH^-$

The quantity of each cathode gas produced is a function of the current efficiency, CE, and total cell current, I:

$$N_{AsH3}=I\ CE/3F\ (\text{moles arsine/second})$$

$$N_{H2}=I(1-CE)/2F(\text{moles of hydrogen/second})$$

Such that the total moles of gas produced per second is:

$$N_{total}=I*[CE/3F+(I-CE)/2F]$$

where F is the Faraday constant.

In known systems, arsenic metal particles in a cathode packed bed reactor are consumed in the electrochemical reaction to produce arsine. Hence, the volume of arsenic particles in the bed and the bed height decreases with the reaction duration. The decrease in the packed bed height also decreases the area on each side of cathode bed. When the anodes are parallel to the bed sides, this decrease in area increases the current density (amperes/electrode area) and therefore, by Tafel's law, increases the cell voltage between the cathode and anodes in a constant current reactor.

If a consumable anode, such as molybdenum, is used in the cell, there is also a build-up of the molybdate ion anode by-products in the electrolyte. The anode by-products coat the packed arsenic bed, decrease the current efficiency, and increase the competing hydrogen reaction over arsine production. The increasing hydride gas bubble void fraction inside the decreasing packed bed volume also increases the cell resistance and contributes to the increased cell voltage over time. These factors limit the amount the arsine generated to about 40% of the arsenic source material loaded in the bed. At this point, the cell has to be stopped, disassembled, and rebuilt. This requires refilling the cell with arsenic metal, the consumable molybdenum anodes, and new electrolyte.

The above problems of; (1) cell voltage increase with anode by-product build-up in the electrolyte, (2) cell voltage increase due to increasing gas void volume fraction inside the decreasing packed bed volume, (3) limited arsenic source material utilization, (4) decreased energy efficiency for arsine production, and (5) frequent disassembly and refilling of the source material in the cell make prior known electrochemical reactors disadvantageous for large scale production of hydride gases. Hence needs exist for systems and methods for electrochemical generation, at large production rates and high energy efficiency of hydride gases on a continuous or semi-continuous basis to facilitate large scale semiconductor manufacturing. Aspects of the present disclosure are addressed to these needs.

SUMMARY

In certain aspects of the present disclosure, provided are electrochemical apparatuses for generation of hydride gas. The apparatuses include an electrochemical reactor having a pressure vessel having an interior containing a cathode, an anode, and an electrolyte, wherein the cathode includes a first amount of an electrically conductive precursor material that is reducible to form the hydride gas. The apparatuses also include a first cathode material refill chamber having an interior containing a second amount of the electrically conductive precursor material and having a first opening communicating with the interior of the pressure vessel for transfer of some or all of the second amount of the electrically conductive precursor material to the interior of the pressure vessel. Further included is a valve selectively positionable to an open position allowing transfer of some or all of the second amount of the electrically conductive precursor material through the first opening and into the interior of the pressure vessel and a closed position providing a gas tight seal between the interior of the pressure vessel and the interior of the cathode material refill chamber.

In other aspects of the present disclosure, provided are electrochemical apparatuses for generation of hydride gas. The apparatuses include an electrochemical reactor having a pressure vessel having an interior containing a cathode, an anode, and an electrolyte, wherein the cathode includes a first amount of an electrically conductive precursor material that is reducible to form the hydride gas. The conductive precursor material is in particulate form, and the cathode includes a packed bed of particles of the conductive precursor material. Also, a bottom of the packed bed is spaced from and faces a top surface of the anode, and/or the packed bed and anode are arranged such that at least 80%, at least 90%, or at least 95% by weight of the particles of the packed bed can be consumed during generation of the hydride gas without changing the electrochemical reaction cross-section area of the reactor (e.g. due to gravity-assisted, downward migration of the particles of the packed bed).

In still other aspects of the present disclosure, provided are methods for generating a hydride gas. The methods include operating an electrochemical reactor having a pressure vessel having an interior containing a cathode, an anode, and an electrolyte, wherein the cathode includes an electrically conductive precursor material that is reducible to form the hydride gas, with the operating causing electrochemical reduction of the electrically conductive precursor material to form hydride gas and thereby consumption of amounts of the electrically conductive precursor material. The methods also include transferring replenishing amounts of the electrically conductive precursor material from an interior of a first cathode material refill chamber into the interior of the pressure vessel, said transferring including transitioning a valve from a closed position providing a gas tight seal between the interior of the pressure vessel and the interior of the cathode material refill chamber to an open position allowing transfer of the replenishing amounts of the electrically conductive precursor material through a first opening of the first cathode material refill chamber and into the interior of the pressure vessel.

In still further aspects of the present disclosure, provided are methods for generating a hydride gas. The methods include providing an electrochemical reactor having a pressure vessel having an interior containing a cathode, an anode, and an electrolyte, wherein the cathode includes a first amount of an electrically conductive precursor material that is reducible to form the hydride gas, wherein the conductive precursor material is in particulate form, wherein the cathode includes a packed bed of particles of the conductive precursor material, and wherein a bottom of the packed bed is spaced from and faces a top surface of the anode and/or the packed bed and anode are arranged such that at least 80%, at least 90%, or at least 95% by weight of the particles of the packed bed can be consumed during generation of the hydride gas without changing the electrochemical reaction cross-section area of the reactor (e.g. due to gravity-assisted, downward migration of the particles of the packed bed). The methods also include conducting electrical current between the cathode and the anode, with the conducting causing electrochemical reduction of the electrically conductive precursor material to form the hydride gas and thereby consumption of amounts of the electrically conductive precursor material.

In additional aspects of the present disclosure, provided are electrochemical apparatuses for generation of hydride gas. The apparatuses include an electrochemical reactor having a pressure vessel having an interior containing a cathode, an anode, and an electrolyte, wherein the cathode includes a first amount of an electrically conductive precursor material that is reducible to form the hydride gas. The apparatuses also include a gas tight filter external of and fluidly connected to the pressure vessel, the apparatus being operable to circulate the electrolyte through the filter to purify the electrolyte of electrochemical by-products. The apparatuses can also include a pump configured to power the circulation of the electrolyte through the filter, and/or can include a one-way valve optionally of the pump) configured to prevent backflow of the electrolyte to the vessel during the circulation. These apparatuses can include features as disclosed in this Summary above for other embodiments or features as disclosed in the following descriptions. Additional method embodiments herein include the generation of a hydride gas with such apparatuses, where such methods can include method features as disclosed in this Summary above or as disclosed in the following descriptions.

Preferred embodiments herein provide energy efficient electrochemical reactors and methods capable of producing large quantities of hydride gas per minute in a continuous or semi-continuous manner. The hydride gas produced can be of sufficient quantity, purity, composition, and pressure for direct introduction into a chemical vapor deposition reactor for the manufacture of semiconductors. The reactor configuration can provide semi-continuous or continuous production of the hydride gas by in-place refilling the packed bed cathode of the electrochemical cell. This can be used to greatly increase the quantity of hydride gas produced over time as compared to other known reactor systems. It can also be used to eliminate or reduce the frequency of the need for expense and lost production time in removing the electrochemical cell from the reactor, disassembling the cell, and changing out the cathode material, electrolyte, and anode materials inside the cell, as exist for some prior known reactor systems.

Particularly preferred electrochemical reactor systems herein can include or feature:
- A lined pressure vessel, preferably comprised of steel, containing a refillable packed bed cathode electrochemical cell; and/or
- A non-conducting perforated plate, at a fixed distance above and parallel to an anode, which supports the packed bed cathode such that the packed bed cathode material is consumed in an electrochemical reaction at a consistent (desirably low) cell voltage between the packed bed bottom and the anode; and/or
- Energy efficient, (minimal Wh/Kg), hydride gas production; and/or
- One or more gas tight cathode (hydride precursor) material refill chambers communicating with (and preferably attached to) the pressure vessel with controllable valve openings, e.g. retractable gate valve door openings, such that cathode material can be selectively moved from the refill chamber(s) into the packed bed in the pressure vessel to replenish the cathode material in the electrochemical cell; and/or
- A controller, such as a microprocessor, to monitor the hydride gas concentration produced by the cell with a binary gas sensor, cell electrical current, and current duration to calculate the quantity of cathode material consumed and based thereon add replacement cathode material from a refill chamber to the packed bed of the electrochemical cell; and/or
- a gas purification filter, such as a molecular sieve, in a gas manifold attached to the vessel to remove water vapor from the hydride gas.
- a pressure sensor on a manifold and controlled by a microprocessor or other controller to adjust the cell current and thereby adjust the pressure in the reactor to provide a suitable gas flow, e.g. to a semiconductor fabrication reactor.

These and other embodiments, features and advantages of products and methods of the present disclosure will be apparent to those of skilled in the art from the descriptions herein.

BRIEF DESCRIPTION OF THE FIGURES

Certain embodiments disclosed herein are particularly illustrated in the accompanying figures, in which.

DETAILED DESCRIPTION

Figure 1:
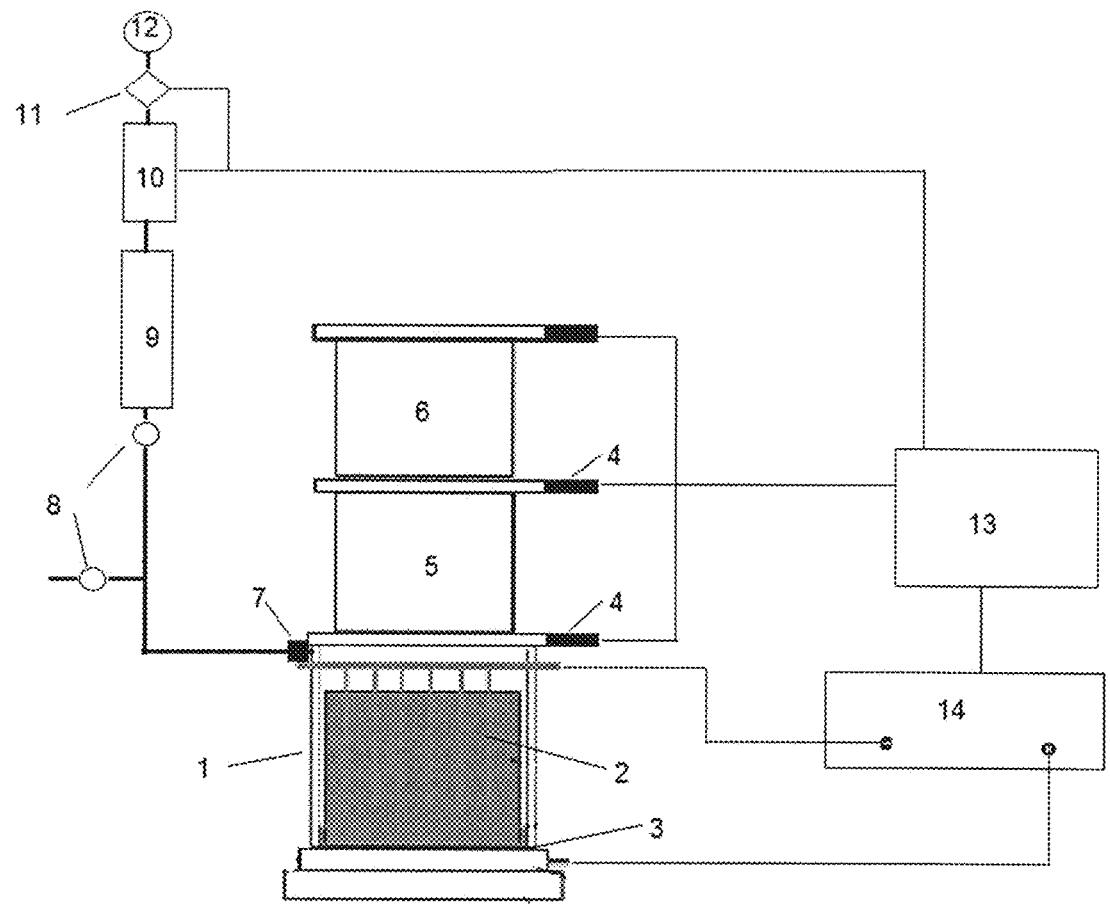
FIG. 1 illustrates an apparatus of, and for carrying out processes of, the present disclosure.

For the purpose of promoting an understanding of the principles of the present disclosure, reference will now be made to embodiments, some of which are illustrated in the drawings, and specific language will be used to describe the same. It will nevertheless be understood that no limitation of the scope of the disclosure is thereby intended. Any alterations and further modifications in the described embodiments, and any further applications of the principles as described herein are contemplated as would normally occur to one skilled in the art to which the disclosure relates.

Certain aspects of the present disclosure are embodied in an electrochemical systems and methods for the generation of hydride gas. Embodiments of particular benefit provide for the energy efficient, high generation rate production of high purity hydride gases, e.g. for semiconductor fabrication reactors.

As shown in FIG. 1, the process and apparatus of the disclosure can employ a lined (e.g. polytetrafluoroethylene-lined) steel or other pressure vessel 1 having an interior within which resides an electrochemical cell including the cathode 2, and anode 3. Other support structures may also be included in the cell as known in the art. Communicating with the interior or the pressure vessel 1 by computer controlled gate door valves or other valves 4, is a first cathode material (hydride gas precursor) refill chamber 5, and second cathode material (hydride precursor) refill chamber 6. The gate door valve can have a first plate that can be slid back and forth to position its hole in an aligned, or non-aligned, condition with a hole of a second plate to open or close the gate door valve, respectively.

The hydride gas produced within the pressure vessel 1 exits the interior through a port 7, to a manifold which contains computer controlled valves 8 to allow exit of the hydride gas as well as the addition of a purge gas and means to evacuate the vessel. The hydride gas passes through one or more filters 9, such as a molecular sieve or a metal organic framework absorbent, which remove water or solvent vapor and other impurities from the hydride gas. The gas then passes through a hydride concentration monitor or sensor 10, and pressure regulator with sensor 11 where it is utilized for semiconductor fabrication, 12.

A microprocessor 13 or other suitable computer controller controls the power supply 14, which provides electric current to the cell. The conduction of current causes (e.g. provides conditions that lead to) the electrochemical reduction of the electrically conductive precursor material to generate the hydride gas. The rate of hydride gas generated is dependent on the current delivered to the cell. The hydride gas generation system can be operated in a feed-back control mode to provide constant pressure delivery of the gas based on pressure sensor on the regulator 11 and increasing or decreasing the current to the cell. For example, the hydride gas generation system can be operated using such control systems as disclosed in U.S. Pat. No. 5,925,232 issued Jul. 20, 199 and entitled Method and Apparatus for Constant Composition Delivery of Hydride Gases for Semiconductor Processing, which is incorporated herein by reference in its entirety. The microprocessor or other controller 13 can also control the sequencing of the manifold valves to evacuate and purge the vessel, the valve to deliver the hydride gas for semiconductor fabrication, and the refill chamber valves 4, as well as sensors and other functions as disclosed herein.

Figure 2:
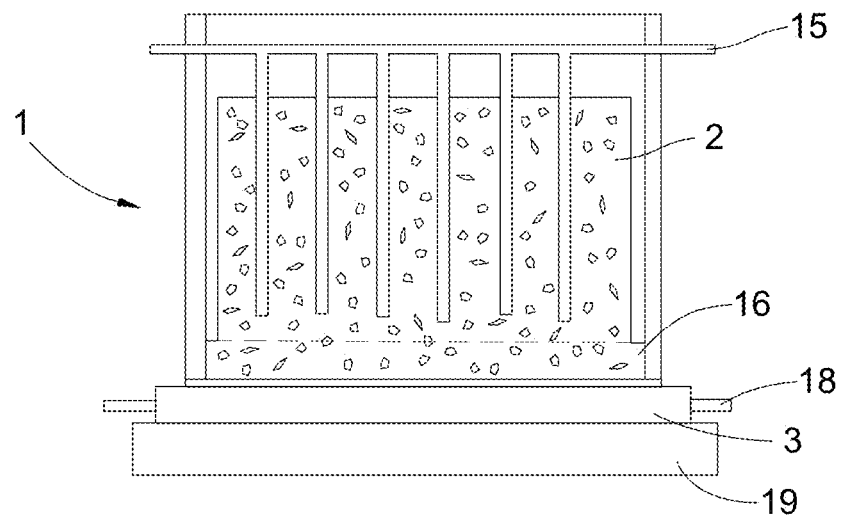
FIG. 2 illustrates a pressure vessel and electrochemical cell of an apparatus of FIG. 1 in detail.
Figure 3:
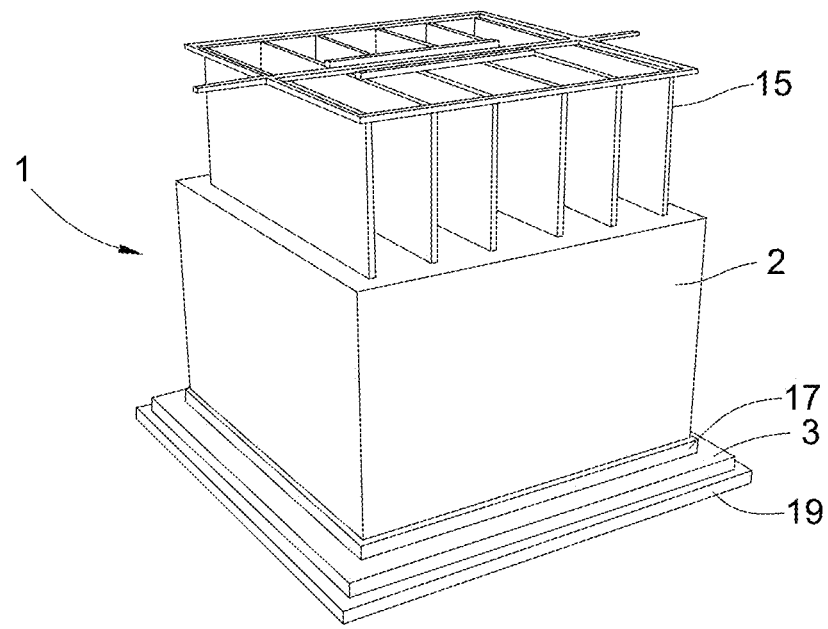
FIG. 3 illustrates a three dimensional view of the apparatus as shown in FIG. 2 with the cathode collector partially removed from the packed bed.

A more detailed illustration of the pressure vessel 1 and electrochemical cell is provided in conjunction with FIGS. 2 and 3. Here the electrochemical cell in the pressure vessel 1 has a top section containing a packed bed cathode region 2, comprising or consisting of the electrically conductive hydride gas precursor material (e.g. arsenic metal pieces or other metal pieces). In this configuration, the cross sectional area of the bottom of the cathode bed is maximized to utilize the vessel dimensions. The hydride gas precursor material is in electrical contact with and moves through a three dimensional cathode current collector 15, in a grid arrangement of perforated metal plates or other electrically conductive elements that are immersed in the cathode bed material 2. The cathode current collector 15 is attached to the power supply 14. The collector grid plate spacing is larger than the arsenic metal pieces to facilitate the movement and feeding of the arsenic pieces to the bottom of the packed bed near the anode surface (e.g. by gravity). This movement of the arsenic pieces (or other hydride precursor material pieces) toward the anode provides a consistent layer of particles at the bottom of the packed bed, spaced from and facing the anode surface, such that a large percentage of the mass of the packed bed can be consumed during hydride gas production without changing the cross-sectional area of the bottom of the packed bed. The lowermost ends of the metallic cathode current collector 14 are kept in the dry section of the packed bed above the electrolyte level 16, to prevent hydrogen formation from electrochemical reduction of water on the collector 15.

In embodiments disclosed herein, the electrically conductive precursor material can comprise arsenic, germanium, antimony, or phosphorous, or the electrically conductive precursor material can comprise a hydride forming metal oxide. In these or other disclosed embodiments, the electrically conductive precursor material is in the form of spheres, rods, plates, pieces, or powder. These and other suitable materials and forms will be apparent to those skilled in the pertinent art from the disclosures herein.

An electrically insulated perforated plate 17 at the bottom of the packed bed supports the cathode bed material 2 and allows the electrolyte covering the anode into the bed material 2. The perforated plate 17 prevents electrical shorting of the arsenic or other hydride gas precursor particles in the bed with the anode 3 surface. Hydrogen gas from a source thereof (e.g. fed from a cylinder or other suitable source) enters the anode 3 through a gas tight port 18. In addition to the perforated separation plate 17, an electrolyte permeable polymer separator material such as Cellguard™ or Porex™ or an anion permeable membrane can be placed between the perforated support plate and the hydrogen oxidation anode surface. The entire structure is supported on an electrically insulated base 19.

The hydrogen oxidation anode can include a dispersed metal catalyst coated on a gas permeable, electrically conductive substrate. The dispersed metal catalyst can include platinum, ruthenium, nickel, copper, and/or cobalt (including alloys thereof with each other and/or other metals). The electrically conductive substrate of the hydrogen oxidation anode can include carbon paper, carbon cloth, titanium mesh, platinum mesh, palladium mesh, platinum coated titanium mesh, and/or nickel mesh. In certain beneficial embodiments, the hydrogen oxidation anode includes carbon cloth or carbon paper and a coating of a dispersed platinum catalyst on the carbon cloth; and, such coating can have a loading of about 0.05 to about 40 mg of platinum per square centimeter of the coating, or in some forms about 0.05 to about 5 mg of platinum per square centimeter of the coating. In still other embodiments, the anode can oxidize a vapor selected from aqueous ammonia, hydrazine and hydrogen peroxide vapor As alternatives to a planar or substantially planar upper anode surface as shown in FIGS. 2 and 3, the anode surface (preferably hydrogen oxidation anode surface) may also be fabricated with corrugated, triangular, rectangular, or other-shaped protrusions along its width to provide increased surface area (as compared to the planar or substantially planar surface). In such cases, the non-conductive perforated plate 17 can be spaced from and follow the contours of the anode surface. The protrusions may be of such a height that the arsenic or other hydride precursor particles fill the spaces between adjacent protrusions, and preferably also occupy a volume positioned above the highest point or points of the anode surface for feed (e.g. gravity feed) of additional precursor particles to fill those spaces as the precursor particles are consumed in the generation of the hydride gas.

Since the hydrogen oxidation combined with arsine generation reactions have a closed water mass balance, the quantity of electrolyte does not change in the packed bed. It can be kept low to minimize the hydride gas bubble transit time out of the electrolyte. Due to the advantage that the cross sectional area of the bed is constant as the bed material is consumed, the gas void fraction in the electrolyte region of the bed does not change with time nor alter the cell voltage.

By placing the hydrogen anode at the smallest distance, L, from the base of the packed bed and maximizing the cross sectional area, A, of the bed, the electrolyte resistance, R, and hence cell voltage, V, are minimized. The equation for the electrolyte resistance is:

$$R = \rho * L/A$$

where $\rho$ is the electrolyte resistivity.

With this resistance, the cell voltage equation is:

$$V = \eta c + fa + I*R$$

where $\eta c$ and $\eta a$ are the respective cathode and anode electrochemical reaction over-potentials at the cell current, I.

Preferred cell design configurations are advantageous in that only the cathode packed bed height, and not the bed electrochemical reaction cross-section area, A, changes as the majority of arsenic metal is consumed. In this or other contemplated arrangements of the packed bed and anode, at least 80% by weight, at least 90%, or at least 95% of the weight of the packed bed particles can be consumed during hydride gas generation without changing the electrochemical reaction cross-section area A (e.g. the overlapping area between the surface of the anode facing the cathode and the cross-sectional dimension defined by the bottom of the packed bed in the depicted reactor design having a horizontally-oriented reaction cross-section area). This is due to the movement of the packed bed particles during consumption for hydride gas generation. This provides a significant advantage over prior art reactor designs with vertically-oriented reaction cross-section areas A, in that the decreasing packed bed height while the vast majority of the packed bed particles is consumed no longer affects the cell voltage since the electrochemical reaction occurs on the bottom fixed area of the packed bed facing the anode surface. Given the disclosures herein, it will be within the purview of those skilled in the field to design and arrange packed bed cathodes and anodes in reactor cells, providing for gravity-assisted or otherwise assisted movement of particles of the packed bed during its consumption, to achieve reactors that consume large percentages of the packed bed cathodes during hydride gas consumption without change of the electrochemical reaction cross section area A.

In some embodiments, the packed bed cathode in the reactor will include at least 50 Kg, at least 100 Kg, or at least 200 Kg, of the particulate arsenic metal or other particulate hydride gas precursor material. Illustrative embodiments can include, for example, from 50 Kg to about 500 Kg of the particulate arsenic metal or other particulate hydride gas precursor material. It will be understood that packed beds initially or at some point having these amounts of the arsenic metal or other particulate hydride gas precursor material will lose mass during hydride gas production due to consumption of the precursor material and may fall below the stated amounts or ranges, unless replenishment amounts of the precursor material are added to the reactor (e.g. continuously, semi-continuously or intermittently) to replenish the packed bed.

Minimizing the cell voltage also minimizes the electrical power, P, required for energy efficient hydride generation:

$$P = I*V = V^2/R \text{ (watts)}$$

This equation illustrates that the power required to generate the hydride gas is proportional to the square of the cell voltage. This non-linear relationship makes the power consumed extremely sensitive to the cell voltage. Hence, decreasing the electrochemical cell voltage from 6 to 2 volts by minimizing the resistance with this cell configuration, decreases the power consumption by a factor of (36/4) or 900%.

Likewise the energy consumption, E, of the electrochemical process is greatly reduced since:

$$E = P*\Delta t \text{ (Joules)}$$

where $\Delta t$ is the operating time of the electrochemical process.

For arsine generation, the energy consumed per mole of gas produced, $E_s$, is defined as:

$$E_s = P*\Delta t/(I*CE/3F)*\Delta t \text{ (Joules/mole)}$$

Substituting I*V for power, P, yields:

$$E_s = 3F*V/CE \text{ (Joule/mole of gas)}$$

Since one watt-hour (Wh) equals 3600 Joules, the energy consumption can also be expressed in Wh/mole units:

$$E_s = 3F*V/(CE*3600) \text{ (Wh/mole)}$$

Therefore, the key parameters to optimize the energy efficiency for arsine and other hydride gas production are the current efficiency, CE, and cell voltage, V. This optimization is accomplished with this preferred electrochemical cell configuration.

Continuous Reactor Operation

To facilitate high level hydride gas production, the electrochemical reactor can operate in a semi-continuous or continuous manner. This is achieved through in-situ refilling the electrochemical cell packed bed with hydride source material stored in the refill chamber. The refill chamber is attached to the top of the packed bed cell though a gas-tight, controlled gate valve door. When the gate door is opened, the source material flows by gravity or mechanical force into the packed bed to replenish the source material in the electrochemical cell. Prior to the source material transfer, the electrochemical cell is evacuated and purged of hydride gas and the cell current is turned off.

In another embodiment of the source material replenishment process, there are two refill chambers stacked on top of each other and separated by controllable gate valve doors. In this case, the top-most chamber top gate door is opened and filled with source material while its lower gate door is closed. Once, this top chamber is filled, and its top gate door closed, the chamber is evacuated of air and filled with pure nitrogen. Next, when the bottom chamber needs to be refilled, the lower gate door on the top chamber is opened to allow the material to flow from the top chamber into the lower chamber. Once completed, the lower door on the top chamber is closed so that it may be refilled again. When the packed bed needs to be refilled, the lower chamber door is opened as before. Through this sequential filling and emptying of the two refill chambers, a continuous source of air and oxygen free hydride source material can be supplied to the packed bed electrochemical cell.

Figure 6:
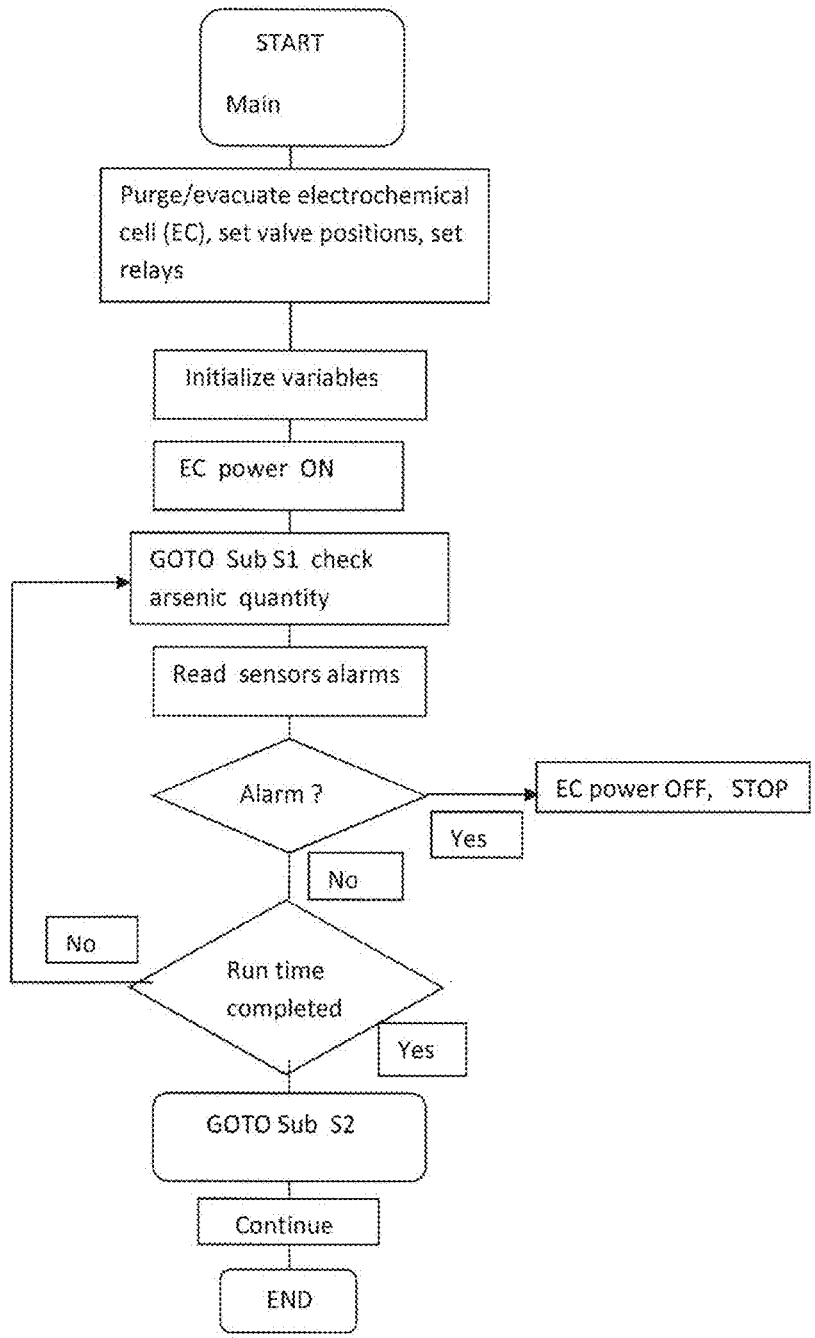
FIGS. 6, 7 and 8 provide flowcharts of control logic for algorithms for control of gate door valves and timing sequences for refilling an electrochemical cell herein, e.g. as described in Examples 2 and 3.
Figure 7:
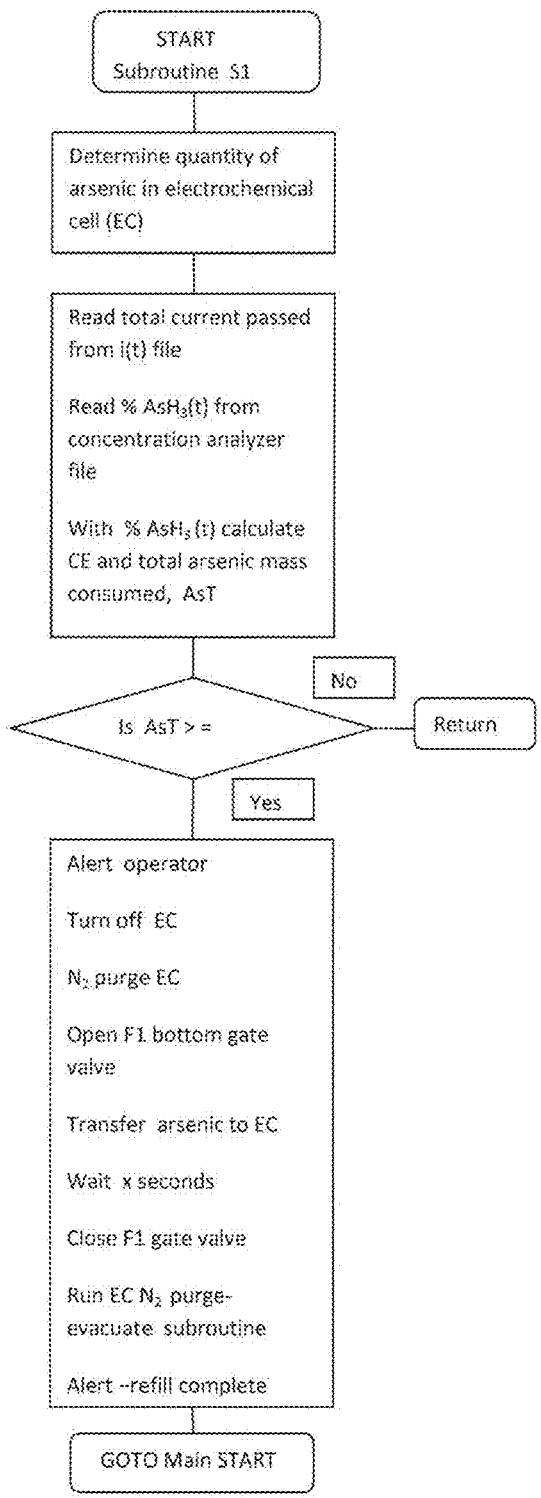
Figure 8:
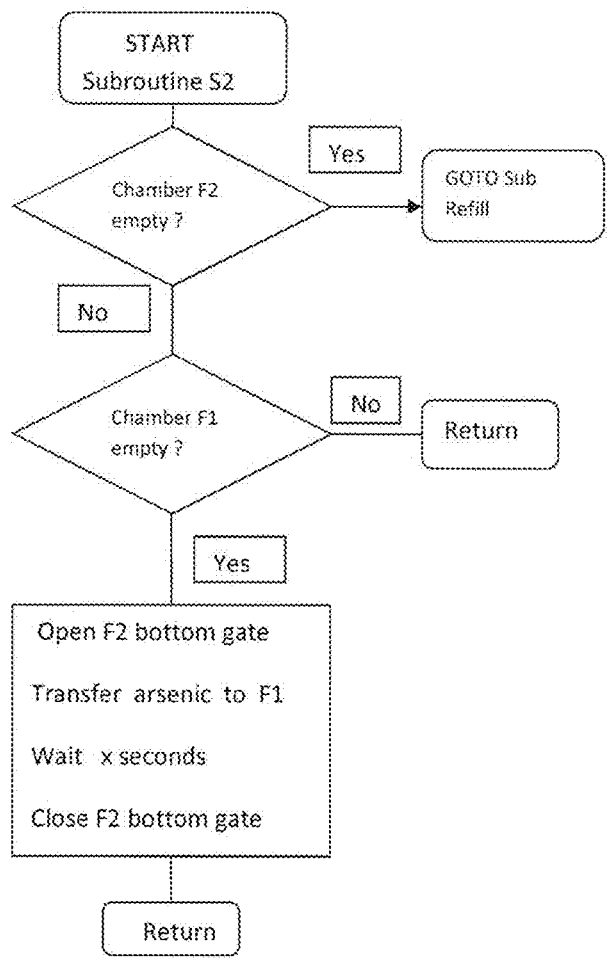

The flowcharts of the software algorithm to control the gate valves and timing sequence for refilling the electrochemical cell described in Examples 2 and 3 are illustrated in FIGS. 6, 7, and 8. FIG. 6 illustrates the main program which controls operation of the gas generation process and calls two subroutines. The key function of the first subroutine, S1, is to determine the amount of arsenic remaining in the electrochemical cell and when to transfer more arsenic into the cell from the refill chamber. This subroutine flowchart is illustrated in FIG. 7. The subroutine reads the cell electrical current, current duration, and arsine gas concentration as a function of time. The arsine concentration is read from an in-line binary gas analyzer (e.g. Piezocon by Veeco, Inc.). The real time arsine concentration reading allows calculation of the time dependent current efficiency, CE. This is the fraction of total cell current that produces the arsine gas versus the by-product hydrogen gas.

The various functions of the electrochemical reactor, gas manifold, and refill chambers can be controlled by a controller, e.g. a software program installed in an embedded microprocessor. The microprocessor has digital to analog input and output devices to monitor sensor signals, such as cell voltage, cell and manifold pressure, hydride gas concentration, and safety alarms. The analog outputs control the cell power supply current, chamber gate doors, and manifold valves.

The controller (e.g. software and microprocessor) can also control the hydride gas pressure, hydride/hydrogen delivery concentration, hydrogen anode gas pressure such that that pressure it is sufficient to match the cell hydride gas delivery pressure.

This reactor configuration embodiment can also be used in a manner that enhances environmental protection by eliminating the mixed molybdate ion and mixed arsenic waste stream and its environmental disposal costs associated with prior art electrochemical cells. Furthermore, the environmental protection provided by the EPA TPQ gas storage requirements are not violated since the amounts of hydride gas in the reactor cell and manifold are far less than that in compressed hydride gas cylinders.

The product hydride gas, e.g. arsine, can be used in the manufacture of products, for example semiconductor materials such as semiconductor lasers, e.g. vertical cavity lasers (VCSEL), light emitting diodes (LED), compound semiconductor solar cells, and high frequency microwave and millimeter wave solid state devices. In some modes of use, generated arsine can be reacted in the formation of a semiconductor material, for example a semiconductor material containing gallium and arsenide (e.g. gallium arsenide (GaAs) or indium gallium arsenide (InGaAs)). Conventional methods for manufacture of such products and semiconductor materials are known and can be used, employing the hydride gas generated as described herein. In this regard, the generated hydride gas can be fed directly into such manufacturing processes and/or can be delivered into suitable storage containers (e.g. pressurized cylinders) for later use in the manufacture of semiconductor materials or other products.

The following Examples are provided to facilitate a further understanding of embodiments disclosed herein, and are illustrative and not limiting of broader aspects disclosed elsewhere herein.

Example 1

A reactor capable of generating arsine gas for 10 days at 480 standard liters per hour (11,520 liters or 37 kg of arsine gas per day), can be constructed with a packed bed cathode of containing 349 Kg of arsenic metal pieces with a packing density of about 75%.

The packed bed rests on an electrolyte permeable plastic separator on top of an electrically insulated perforated plate which supports the weight of the bed. The holes in the perforated plate are smaller than the approximately 5-15 mm arsenic metal pieces. The separator and perforated plate prevent electrical shorting between of the arsenic pieces and the anode surface.

The metallic cathode current collectors immersed in the arsenic bed and are kept approximately 10 cm above the electrolyte at the bottom of the bed. Busbars to the cathode current collectors and hydrogen anode current collectors are connected through gas tight ports on the pressure vessel side to a direct current power supply. The total electrical current required to generate the arsine gas at this rate is 1888 amperes with an 85% current efficiency.

The hydrogen oxidation anode utilizes a carbon cloth with a suitable platinum catalyst loading (e.g. about 2 mg/cm$^2$ to about 8 mg/cm$^2$) and a gas permeable hydrophobic layer on the back side. The anode is attached to a conductive hydrogen gas channel plate which is mounted on a current collector plate.

In one embodiment, the cell electrolyte is an aqueous solution of 30% potassium hydroxide with a conductivity of 0.6 ohm-cm$^{-1}$ or resistivity of 1.67 ohm-cm. For a 1 cm distance between the bottom of the packed bed and surface of the HOA, the resistance is:

$R=\rho*L/A=1.67*(1/2500)=0.0007$ ohms

Therefore, the voltage drop across the electrolyte at 1888 amps is:

$V_{el}=1888*7\times10^{-4}=1.26$ volts

The cell voltage contribution of the hydrogen anode and arsine cathode reactions is calculated from and their respective reaction potentials:

$Ea_o=0-0.059*pH$ and $Ec_o=-0.608-0.059*pH$

Hence, the equilibrium reaction voltage at any electrolyte pH is:

$Ea_o-Ec_o=0.608$ volts

The total cell voltage is:

$V_{cell}=\eta c+\eta a+I*R$ where $\eta a=Ea-Ea_o$ $\eta c=Ec-Ec_o$ such that:

$V_{cell}=0.608+(Ec-Ea)+(I*7\times10^{-4})$

Commercial hydrogen oxidation anodes (e.g. Fumasep FAA) have little overpotential up to current densities of 1 A/cm$^2$. Hence, at a cell current of 1888 amps and cathode overpotential is about 0.52 volts, the cell voltage is:

Vcell=$0.608+0.52+(1888*7\times10^{-4})=2.38$ volts

Thus, the power consumption at this voltage is $P=I*Vcell=1888*2.39=4.51$ KW

Operating the electrochemical reactor for a 24 hour day would require 108 KWh of electrical energy. Finally, the arsine generation energy efficiency, defined by the specific energy per kilogram of arsine produced for this preferred embodiment is:

$E_s=108$ KWh/37Kg=2.93 KWh/Kg

The safety advantage of this reactor configuration is that it generates arsine only when operating. Hence, the maximum amount of arsine contained in the gas manifold is very small. At the rate of 37 Kg of arsine per day there is only 1.54 kg/hour or 26 grams per minute of arsine in the manifold. No additional arsine is produced the instant the electrical current is turned off. In contrast, commercial compressed gas cylinders contain about 10 kg of arsine gas. Therefore, compared to even one compressed gas cylinder containing 10 kg of arsine, the electrochemical reactor contains only 0.026/10 kg or about 0.26% of the arsine that could be released from a cylinder accident. At the 100 pound OSHA arsine cylinder storage limit, the reactor contains only 0.026/45.4 or about 0.06% of the amount arsine stored in the cylinders.

Therefore, arsine release from a high pressure arsine cylinder accident is a much larger environmental threat to the semiconductor factory or surrounding community.

Example 2

Figure 4:
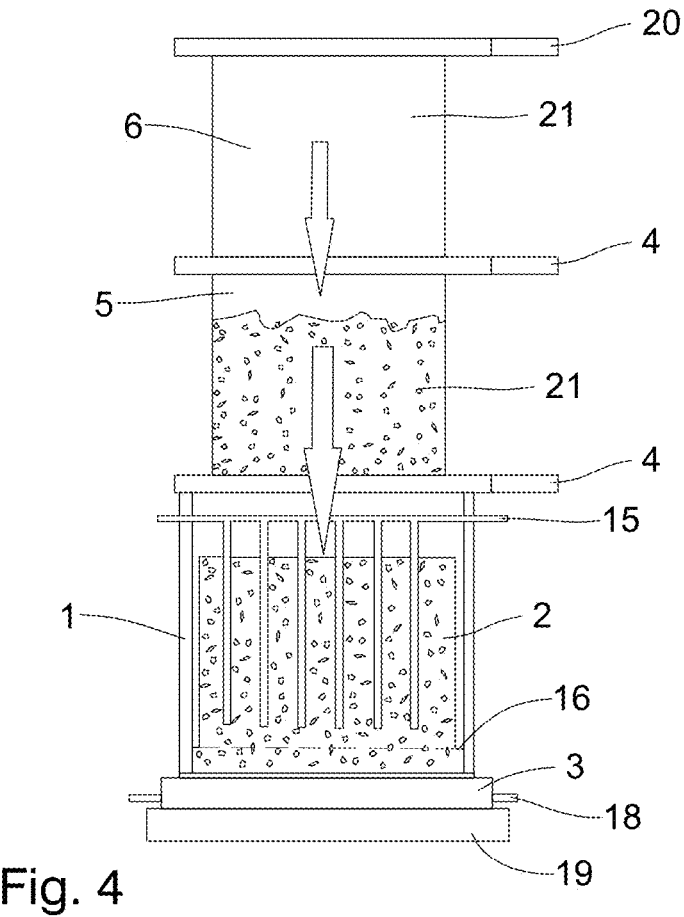
FIG. 4 illustrates two hydride precursor material refill chambers mounted on the pressure vessel with gate valve doors.

The reactor of Example 1 is modified so that the electrochemical cell packed bed cathode source material is replenished for semi-continuous operation. FIG. 4 shows the reactor pressure vessel modified with a source material refill chamber 5 and controllable pneumatic gate doors to allow the transfer of the source material from the refill chamber 5 to the electrochemical cell.

Figure 5:
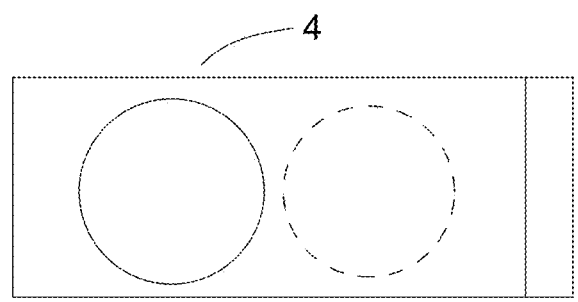
FIG. 5 illustrates a top view of a gate door valve as shown in FIG. 4.

In this case, the stainless steel top of the pressure vessel containing the electrochemical cell is removed and replaced with a new top containing a pneumatically retractable gate door with a 10" diameter pneumatic gate door opening (Kurt-Lesker Co. Series 108) mounted in the center of the new stainless steel gas tight top (FIG. 5). An 8" diameter, 20" tall cylindrical stainless steel chamber with 10" diameter, o-ring flanges on each end is placed on top of, and bolted to, the gate door such that it forms a gas tight seal with the vessel. A second identical gate door is also bolted to the top of the 20" tall cylinder so when closed the chamber is gas tight. Electropolished ¼" stainless tubing is connected between the refill chamber and the reactor gas manifold. Pneumatic valves on the tubing allow the microprocessor software to evacuate and purge with nitrogen gas the air originally in the chamber and well as open and close the pneumatic gate valves.

With this replenishment chamber 5 attached to the reactor vessel containing the cell, the top gate door 4 to chamber 5 is opened and filled with approximately 40 kg of 5-15 mm arsenic metal pieces. The top gate door 4 to chamber 5 is then closed and the air is evacuated from the chamber and arsenic. The air is replaced with nitrogen purge gas at atmospheric pressure. The vessel containing the electrochemical cell is likewise evacuated and purged of arsine gas. The chamber bottom gate valve door is then retracted to allow the arsenic pieces to flow into the packed bed through the metal current collector grid and thereby replenish the arsenic in the packed bed. Once filled, the chamber bottom gate door is closed so the electrochemical cell can resume generating arsine gas.

Example 3

A reactor capable of continuous electrochemical generation of hydride gas is constructed with two refilling chambers. In FIG. 4, the top chamber 6 with controllable gate door 20, is filled by either manual loading of arsenic into the top or an enclosed mechanical conveyer belt or similar feeding device provides arsenic pieces to the top refill chamber 6. FIG. 4 also shows the arsenic pieces 21, transferred from the top refill chamber through another gate valve door 4, into the refill chamber 5 below it. Finally, as described in Example 2, the arsenic in the lower refill chamber 5 can be transferred to the electrochemical cell in the pressure vessel through its lower gate valve door 4.

The pressure vessel 1 and two refill chambers 5 and 6 above it are connected to the gas manifold with piping and valves for purge and evacuating the chambers of air or other gases. The pressure vessel also has an electrolyte fill port to occasionally add water or electrolyte 3 at the bottom of the packed bed 2. This compensates for water vapor loss from the electrolyte into the gas manifold.

Example 4

To insure continuous operation of the hydride generator, the software algorithm can determine when to refill the electrochemical cell. This is done by first reading the manifold arsine gas concentration with the in-line binary gas analyzer (i.e. Piezocon, Inc.) mounted on the gas manifold. This real-time arsine concentration allows calculation of the current efficiency, CE, which is the fraction of total cell current that produces the arsine gas versus the by-product hydrogen gas. As shown in the description above, the gas production rates, in moles of gas per second, are calculated with:

$$N_{AsH3}=I*CE/3F$$

$$N_{H2}=I*(I-CE)/2F$$

The arsine concentration, % $AsH_3$, is:

$$\% AsH_3=N_{AsH3}/(N_{AsH3}+N_{H2})$$

Substituting the equations for each gas produced allows calculation of the current efficiency from the measured arsine concentration:

$$\% AsH_3=1/(1+3(1-CE)/2CE)$$

For example, when % $AsH_3$ equals 70%, CE=0.78. The mass of arsenic source material consumed, $M_{As}$, at constant current cell operation, is then calculated by multiplying the moles of arsine produced, $N_{AsH3}$, by the arsenic molecular weight, Mw, and the cell operating time, $\Delta t$:

$$M_{As}=(Mw*I/3F)*CE*\Delta t$$

If the amount of arsenic consumed is equal to or greater than the arsenic in the cell, the electrochemical cell is turned off, the cell is purged of arsine, and new arsenic is added to the cell from the refill chamber. The software subroutine then returns to the main program.

A second software subroutine (S2 shown in FIG. 8) is only called when the arsine gas generation period is completed. At that time, S2 is called to check if the arsenic refill chamber F2 is empty. If not the arsenic in F2 is transferred to refill chamber F1 by opening the gate valve door on the bottom of F2. By this means, refill chamber F1 always has arsenic to transfer to the electrochemical cell for continuous operation.

While discussions herein sometimes focus on the generation of arsine gas from arsenic metal, it will be understood that other hydride gas precursor materials are known and can be used in reactor designs as disclosed herein to make other hydride gases and reactors for generating them. Likewise, while discussions above illustrate specific embodiments of electrochemical reactors, it will be understood that elements and principles thereof as disclosed can be used in other electrochemical reactors. The enumerated embodiments as set forth below in the Enumerated Listing of Certain Embodiments disclose additional and sometimes more generalized or more specific embodiments, which skilled persons will understand can be combined with or substituted for features of the specific embodiments disclosed above. These disclosures of the enumerated embodiments include but are not limited to disclosed embodiments for hydride gas precursor materials used in cathodes, anode materials and constructions, oxidation or reduction reactions, dimensions, ratios between reactor elements, electrolytes, separator or spacer materials and arrangements, operational modes or parameters for reactors or apparatuses, and uses of product hydride gases.

ENUMERATED LISTING OF CERTAIN EMBODIMENTS

The following provides an illustrative, non-limiting, enumerated listing of some of the embodiments disclosed herein.

1. An electrochemical apparatus for generation of hydride gas, comprising:
    an electrochemical reactor having a pressure vessel having an interior containing a cathode, an anode, and an electrolyte, wherein the cathode includes a first amount of an electrically conductive precursor material that is reducible to form the hydride gas;
    a first cathode material refill chamber having an interior containing a second amount of the electrically conductive precursor material and having a first opening communicating with the interior of the pressure vessel for transfer of some or all of the second amount of the electrically conductive precursor material to the interior of the pressure vessel;
    a valve selectively positionable to an open position allowing transfer of some or all of the second amount of the electrically conductive precursor material through the first opening and into the interior of the pressure vessel and a closed position providing a gas tight seal between the interior of the pressure vessel and the interior of the cathode material refill chamber.
2. An electrochemical apparatus for generation of hydride gas, comprising:
    an electrochemical reactor having a pressure vessel having an interior containing a cathode, an anode, and an electrolyte, wherein the cathode includes a first amount of an electrically conductive precursor material that is reducible to form the hydride gas;
    wherein the conductive precursor material is in particulate form, and wherein the cathode includes a packed bed of particles of the conductive precursor material; and
    wherein (i) a bottom of the packed bed is spaced from and faces a top surface of the anode and/or (ii) the packed bed and anode are arranged such that at least 80% (preferably at least 90% and more preferably at least 95%) by weight of the particles of the packed bed can be consumed during generation of the hydride gas by the apparatus without changing the electrochemical reaction cross-section area of the reactor.
3. The apparatus of embodiment 1, also comprising a controller operable to selectively position the valve to said open position and said closed position.
4. The apparatus of embodiment 1, 2 or 3, also comprising a controller operable to control generation of the hydride gas and maintain a flow rate and pressure of the generated hydride gas.
5. The apparatus of any preceding embodiment, also comprising a gas manifold and tubing connected to the pressure vessel for delivering the hydride gas to a semiconductor fabrication reactor.
6. The apparatus of any preceding embodiment, wherein the conductive precursor material is in particulate form, and wherein the cathode includes a packed bed of particles of the conductive precursor material.
7. The apparatus of any preceding embodiment, wherein the conductive precursor material is a metallic precursor material.
8. The apparatus of embodiment 6 or 7, also comprising cathode current collectors immersed in the packed bed, the current collectors configured to allow movement of the conductive precursor material in the packed bed as it is consumed.
9. The apparatus of embodiment 8, wherein the cathode current collectors are positioned above a level of the electrolyte in the packed bed.
10. The apparatus of embodiment 8 or 9, wherein the cathode current collectors are configured as a three dimensional, perforated metal grid.
11. The apparatus of embodiment 10, wherein the grid has grid dimensions larger than the dimensions of the particles of the packed bed.
12. The apparatus of any one of embodiments 6 to 11, wherein a bottom of the packed bed faces a top surface of the anode and/or the packed bed and the anode are arranged such that at least 80% (preferably at least 90% and more preferably at least 95%) by weight of the particles of the packed bed can be consumed during generation of the hydride gas by the apparatus without changing the electrochemical reaction cross-section area of the reactor.
13. The apparatus of embodiment 2 or 12, wherein a cross sectional area of the bottom of the packed bed remains constant as the conductive precursor material is consumed during generation of the hydride gas.
14. The apparatus of embodiment 12 or 13, wherein the bottom of the packed bed is spaced a first distance from the top surface of the anode, and wherein the value of the first distance divided by the cross-sectional area of the packed bed is in the range of about 0.0004 to about 0.002.
15. The apparatus of embodiment 2 or any one of embodiments 6 to 14, also comprising a non-electrically conducting perforated plate supporting the packed bed.
16. The apparatus of embodiment 15, also comprising a separator material that is permeable to the electrolyte or electrolyte ions positioned between the perforated plate and the surface of the anode.
17. The apparatus of any preceding embodiment, wherein the electrically conductive precursor material comprises arsenic, germanium, antimony, or phosphorous.
18. The apparatus of any preceding embodiment, wherein the electrically conductive precursor material comprises a hydride forming metal oxide.
19. The apparatus of any preceding embodiment, wherein the electrically conductive precursor material is in the form of spheres, rods, plates, pieces, or powder.
20. The apparatus of any preceding embodiment, characterized by having an anode oxidation reaction with a standard potential of less than 1 volt versus a Hg/HgO reference electrode, and preferably wherein the anode is a non-oxygen evolving anode.
21. The apparatus of any preceding embodiment, wherein the anode comprises a hydrogen oxidation anode.
22. The apparatus of embodiment 21, wherein the hydrogen oxidation anode comprises a dispersed metal catalyst coated on a gas permeable, electrically conductive substrate.
23. The apparatus of embodiment 22, wherein the dispersed metal catalyst comprises platinum, ruthenium, nickel, copper, and/or cobalt.

24. The apparatus of embodiment 22 or 23, wherein the electrically conductive substrate of the hydrogen oxidation anode comprises carbon paper, carbon cloth, titanium mesh, palladium mesh, and/or nickel mesh.

25. The apparatus of embodiment 21, wherein the hydrogen oxidation anode comprises carbon cloth and a coating of a dispersed platinum catalyst on the carbon cloth.

26. The apparatus of embodiment 25, wherein the coating has a loading of about 0.05 to about 5 mg of platinum per square centimeter of the coating.

27. The apparatus of any preceding embodiment, wherein the anode oxidizes a vapor selected from aqueous ammonia, hydrazine and hydrogen peroxide vapor 28. The apparatus of any preceding embodiment, wherein the conductive precursor material is in particulate form, wherein the cathode includes a packed bed of the conductive precursor material, and wherein the anode has a top surface with a surface area equal to, or within 10% of, a cross-sectional area of the bottom of the packed bed.

29. The apparatus of any preceding embodiment, characterized by having an anode reaction which is oxidation of a quinone compound or a metal to metal hydroxide redox couple selected from the group iron hydroxide, molybdenum hydroxide, tungsten hydroxide, cobalt hydroxide, and/or nickel hydroxide.

30. The apparatus of any preceding embodiment, wherein the electrolyte comprises an aqueous alkaline solution; KOH, CsOH, LiOH, NaOH, or a combination thereof.

31. The apparatus of any preceding embodiment, also comprising a gas tight filter external of and fluidly connected to the pressure vessel, the apparatus being operable to circulate the electrolyte through the filter to purify the electrolyte of electrochemical by-products.

32. The apparatus of embodiment 31, also comprising a pump configured to power the circulation of the electrolyte through the filter.

33. The apparatus of embodiment 32, also comprising a one-way valve, optionally of the pump, configured to prevent backflow of the electrolyte to the vessel during the circulation.

34. The apparatus of any preceding embodiment, wherein the electrochemical reactor is operable to generate arsine gas at a pressure greater than or equal to 1 atmosphere.

35. The apparatus of embodiment 34, wherein the electrochemical reactor is also operable to generate the arsine gas with an energy consumption between 165 and 485 Wh/mole of the arsine gas generated.

36. The apparatus of embodiment 1 or any preceding embodiment as immediately or ultimately dependent on embodiment 1, wherein the electrochemical reactor is operable in a semi-continuous mode by transitioning the first valve from said closed position to said open position under control of a controller so as to cause a transfer of some or all of the second amount of the conductive precursor material into the interior of the pressure vessel.

37. The apparatus of embodiment 36, wherein the controller transitions the valve to the open position and maintains the valve in the open position based on an algorithm that calculates an amount of the first amount of the conductive precursor material that has been consumed.

38. The apparatus of embodiment 1 or any preceding embodiment as immediately or ultimately dependent on embodiment 1, wherein the electrochemical reactor further comprises a second cathode material refill chamber having a second opening communicating with the first cathode material refill chamber, and a second valve selectively positionable to an open position allowing transfer of some or all of a third amount of the electrically conductive precursor material through the second opening to the interior of the first cathode material refill chamber and a closed position providing a gas tight seal of the second opening.

39. The apparatus of embodiment 38, which is operable in a continuous mode by controller-controlled operation of the first valve and the second valve to cause replenishment of the electrically conductive precursor material in the presser vessel over time, with the replenishment including transfer of amounts of the precursor material through the first opening and the second opening.

40. The apparatus of embodiment 38 or 39, wherein the second cathode material refill chamber has a controllable valve door at a position spaced from the second valve, the controllable valve door positionable to a closed position and positionable to an open position allowing addition of further amounts of the conductive precursor material to the second cathode material refill chamber.

41. The apparatus of embodiment 40, wherein the further amounts of electrically conductive precursor material are transferable through the valve door, when in its open position, by gravity or a mechanical feed device.

42. The apparatus of any preceding embodiment, also comprising a manifold communicating with the interior of the pressure vessel and arranged to receive a flow of hydride gas generated in the interior of the pressure vessel.

43. The apparatus of embodiment 42, also comprising a contact drying material that removes water from the hydride gas generated in the interior of the pressure vessel, the contact drying material positioned to contact the flow of hydride gas generated in the interior of the pressure vessel.

44. The apparatus of embodiment 43, also comprising a source of diluent gas arranged to blend a diluent gas with the hydride gas, preferably after contact of the hydride gas with the contact drying material.

45. The apparatus of embodiment 43 or 44, wherein the contact drying material comprises a molecular sieve or a metal organic framework absorbent.

46. The apparatus of embodiment 44 or 45, wherein the diluent gas is hydrogen or nitrogen.

47. The apparatus of any preceding embodiment, configured to deliver a gas including the hydride gas generated in the interior of the pressure vessel at a pressure in the range of about 1 and 100 psig.

48. The apparatus of any preceding embodiment, comprising a computer controller operable to monitor and control manifold sensors, the first valve, the second valve, and functions for purging, evacuating, blending, and delivering the hydride gas.

49. The apparatus of embodiment 1 or any preceding embodiment as immediately or ultimately dependent on embodiment 1, wherein the first valve is a gate valve.

50. The apparatus of embodiment 38 or any preceding embodiment as immediately or ultimately dependent on embodiment 38, wherein the second valve is a gate valve.

51. The apparatus of embodiment 40 or any preceding embodiment as immediately or ultimately dependent on embodiment 40, wherein the valve door is a gate valve.

52. A method for generating a hydride gas, comprising:
operating an electrochemical reactor having a pressure vessel having an interior containing a cathode, an anode, and an electrolyte, wherein the cathode includes an electrically conductive precursor material that is reducible to form the hydride gas, said operating causing electrochemical reduction of the electrically conductive precursor material to form hydride gas and thereby consumption of amounts of the electrically conductive precursor material;
transferring replenishing amounts of the electrically conductive precursor material from an interior of a first cathode material refill chamber into the interior of the pressure vessel, said transferring including transitioning a valve from a closed position providing a gas tight seal between the interior of the pressure vessel and the interior of the cathode material refill chamber to an open position allowing transfer of the replenishing amounts of the electrically conductive precursor material through a first opening of the first cathode material refill chamber and into the interior of the pressure vessel.

53. A method for generating a hydride gas, comprising:
providing an electrochemical reactor having a pressure vessel having an interior containing a cathode, an anode, and an electrolyte, wherein the cathode includes a first amount of an electrically conductive precursor material that is reducible to form the hydride gas, wherein the conductive precursor material is in particulate form, wherein the cathode includes a packed bed of particles of the conductive precursor material, and wherein (i) a bottom of the packed bed is spaced from and faces a top surface of the anode and/or (ii) the packed bed and anode are arranged such that at least 80% (preferably at least 90% and more preferably at least 95%) by weight of the particles of the packed bed can be consumed during generation of the hydride gas by the apparatus without changing the electrochemical reaction cross-section area of the reactor; and
conducting electrical current between the cathode and the anode, said conducting causing electrochemical reduction of the electrically conductive precursor material to form the hydride gas and thereby consumption of amounts of the electrically conductive precursor material.

54. The method of embodiment 53, also comprising selectively positioning the valve to said open position and said closed position under control of a controller.

55. The method of embodiment 53 or 54, also comprising controlling generation of the hydride gas under control of a controller and maintaining a flow rate and pressure of the generated hydride gas under control of the controller.

56. The method of any one of embodiments 53 to 55, also comprising delivering the hydride gas to a semiconductor fabrication reactor.

57. The method of any one of embodiments 53 to 56, wherein the conductive precursor material is in particulate form, and wherein the cathode includes a packed bed of particles of the conductive precursor material.

58. The method of any one of embodiments 53 to 57, wherein the conductive precursor material is a metallic precursor material.

59. The method of embodiment 57 or 58, wherein the electrochemical reactor also comprises cathode current collectors immersed in the packed bed, the current collectors configured to allow movement of the conductive precursor material in the packed bed as it is consumed.

60. The method of embodiment 59, wherein the cathode current collectors are positioned above a level of the electrolyte in the packed bed.

61. The method of embodiment 59 or 60, wherein the cathode current collectors are configured as a three dimensional, perforated metal grid.

62. The method of embodiment 61, wherein the grid has grid dimensions larger than the dimensions of the particles of the packed bed.

63. The method of any one of embodiments 57 to 62, wherein a bottom of the packed bed faces a top surface of the anode and/or the packed bed and anode are arranged such that at least 80% (preferably at least 90% and more preferably at least 95%) by weight of the particles of the packed bed can be consumed during generation of the hydride gas by the apparatus without changing the electrochemical reaction cross-section area of the reactor.

64. The method of embodiment 53 or 63, wherein a cross sectional area of the bottom of the packed bed remains constant as the conductive precursor material is consumed during generation of the hydride gas.

65. The method of embodiment 63 or 64, wherein the bottom of the packed bed is spaced a first distance from the top surface of the anode, and wherein the value of the first distance divided by the cross-sectional area of the packed bed is in the range of about 0.0004 to about 0.002.

66. The method of embodiment 53 or any one of embodiments 57 to 65, wherein the electrochemical reactor also comprises a non-electrically conducting perforated plate supporting the packed bed.

67. The method of embodiment 66, wherein the electrochemical reactor also comprises a separator material that is permeable to the electrolyte or electrolyte ions positioned between the perforated plate and the surface of the anode.

68. The method of any one of embodiments 52 to 67, wherein the electrically conductive precursor material comprises arsenic, germanium, antimony, or phosphorous.

69. The method of any one of embodiments 52 to 68, wherein the electrically conductive precursor material comprises a hydride forming metal oxide.

70. The method of any one of embodiments 52 to 69, wherein the electrically conductive precursor material is in the form of spheres, rods, plates, pieces, or powder.

71. The method of any one of embodiments 52 to 70, characterized by having an anode oxidation reaction with a standard potential of less than 1 volt versus a Hg/HgO reference electrode.

72. The method of any one of embodiments 52 to 71, wherein the anode comprises a hydrogen oxidation anode.

73. The method of embodiment 72, wherein the hydrogen oxidation anode comprises a dispersed metal catalyst coated on a gas permeable, electrically conductive substrate.
74. The method of embodiment 73, wherein the dispersed metal catalyst comprises platinum, ruthenium, nickel, copper, and/or cobalt.
75. The method of embodiment 73 or 74, wherein the electrically conductive substrate of the hydrogen oxidation anode comprises carbon paper, carbon cloth, titanium mesh, palladium mesh, and/or nickel mesh.
76. The method of embodiment 72, wherein the hydrogen oxidation anode comprises carbon cloth and a coating of a dispersed platinum catalyst on the carbon cloth.
77. The method of embodiment 76, wherein the coating has a loading of about 0.05 to about 5 mg of platinum per square centimeter of the coating.
78. The method of any one of embodiments 52 to 77, wherein the anode oxidizes a vapor selected from aqueous ammonia, hydrazine and hydrogen peroxide vapor.
79. The method of any one of embodiments 52 to 78, wherein the conductive precursor material is in particulate form, wherein the cathode includes a packed bed of the conductive precursor material, and wherein the anode has a top surface with a surface area equal to, or within 10% of, a cross-sectional area of the bottom of the packed bed.
80. The method of any one of embodiments 52 to 79, characterized by having an anode reaction which is oxidation of a quinone compound or a metal to metal hydroxide redox couple selected from the group iron hydroxide, molybdenum hydroxide, tungsten hydroxide, cobalt hydroxide, and/or nickel hydroxide.
81. The method of any one of embodiments 52 to 80, wherein the electrolyte comprises an aqueous alkaline solution; KOH, CsOH, LiOH, NaOH, or a combination thereof.
82. The method of any one of embodiments 52 to 81, wherein the electrochemical reactor also comprises a gas tight filter external of and fluidly connected to the pressure vessel, the method also comprising circulating the electrolyte through the filter to purify the electrolyte of electrochemical by-products.
83. The method of embodiment 82, also comprising operating a pump to power the circulation of the electrolyte through the filter.
84. The method of embodiment 83, also comprising preventing backflow of the electrolyte to the vessel with a one-way valve during the circulation, the one-way valve being optionally of the pump.
85. The method of any one of embodiments 52 to 84, which generates arsine gas at a pressure greater than or equal to 1 atmosphere.
86. The method of embodiment 85, which generates the arsine gas with an energy consumption between 165 and 485 Wh/mole of the arsine gas generated.
87. The method of embodiment 52 or any preceding method embodiment as immediately or ultimately dependent on embodiment 52, wherein said operating includes operating the electrochemical reactor in a semi-continuous mode that includes transitioning the first valve from said closed position to said open position under control of a controller so as to cause a transfer of some or all of the second amount of the conductive precursor material into the interior of the pressure vessel.
88. The method of embodiment 87, wherein the controller transitions the valve to the open position and maintains the valve in the open position based on an algorithm that calculates an amount of the first amount of the conductive precursor material that has been consumed.
89. The method of embodiment 52 or any preceding method embodiment as immediately or ultimately dependent on embodiment 52, wherein the electrochemical reactor further comprises a second cathode material refill chamber having a second opening communicating with the first cathode material refill chamber, and a second valve selectively positionable to an open position allowing transfer of some or all of a third amount of the electrically conductive precursor material through the second opening to the interior of the first cathode material refill chamber and a closed position providing a gas tight seal of the second opening.
90. The method of embodiment 89, wherein said operating includes operating the electrochemical reactor in a continuous mode that includes controlling the first valve and the second valve with a controller to cause replenishment of the electrically conductive precursor material in the presser vessel over time, with the replenishment including transfer of amounts of the precursor material through the first opening and the second opening.
91. The method of embodiment 89 or 90, wherein the second cathode material refill chamber has a controllable valve door at a position spaced from the second valve, the controllable valve door positionable to a closed position and positionable to an open position allowing addition of further amounts of the conductive precursor material to the second cathode material refill chamber.
92. The method of embodiment 91, comprising transferring the further amounts of electrically conductive precursor material through the valve door, when in its open position, by gravity or a mechanical feed device.
93. The method of any preceding method embodiment, wherein the electrochemical reactor also comprises a manifold communicating with the interior of the pressure vessel, the method also comprising receiving in the manifold a flow of hydride gas generated in the interior of the pressure vessel.
94. The method of embodiment 93, also comprising removing water vapor from the hydride gas generated in the interior of the pressure vessel, preferably by contact with a contact drying material.
95. The method of embodiment 94, also comprising blending a diluent gas with the hydride gas, preferably after said removing water vapor step.
96. The method of embodiment 94 or 95, wherein the contact drying material comprises a molecular sieve or a metal organic framework absorbent.
97. The method of embodiment 95 or 96, wherein the diluent gas is hydrogen or nitrogen.
98: The method of any one of embodiments 52 to 97, also comprising delivering a gas including the hydride gas generated in the interior of the pressure vessel at a pressure in the range of about 1 and 100 psig.
99. The method of any one of embodiments 52 to 98, also comprising monitoring and controlling, by a computer controller, manifold sensors, the first valve, the second valve, and functions for purging, evacuating, blending, and delivering the hydride gas.

100. The method of embodiment 52 or any preceding method embodiment as immediately or ultimately dependent on embodiment 52, wherein the first valve is a gate valve.

101. The method of embodiment 89 or any preceding method embodiment as immediately or ultimately dependent on embodiment 89, wherein the second valve is a gate valve.

102. The method of embodiment 91 or any preceding method embodiment as immediately or ultimately dependent on embodiment 91, wherein the valve door is a gate valve.

103. A method of generating a hydride gas, comprising operating an electrochemical apparatus according to any one of embodiments 1 to 51 so as to generate the hydride gas.

104. A method for fabricating a semiconductor material that comprises preparing a semiconductor material using a feed of a hydride gas, wherein the hydride gas has been generated according to a method of any one of embodiments 52 to 103, and preferably wherein the hydride gas is arsine and the semiconductor material includes gallium and arsenide.

105. A semiconductor material prepared by a method according to embodiment 104.

106. The apparatus of embodiment 23 or any embodiment dependent on claim 23, wherein the dispersed metal catalyst is an alloy of platinum, ruthenium, nickel, copper, and/or cobalt.

107. The apparatus of embodiment 22 or 23 or any embodiment dependent on embodiment 22 or 23, wherein the electrically conductive substrate of the hydrogen oxidation anode comprises platinum mesh, platinum coated titanium mesh, palladium mesh and/or nickel mesh.

108. The apparatus of embodiment 21 or any embodiment dependent on embodiment 21, wherein the hydrogen oxidation anode comprises carbon paper and a coating of a dispersed platinum catalyst on the carbon paper.

109. The apparatus of embodiment 25 or any embodiment dependent on embodiment 25, wherein the coating has a loading of about 0.05 to about 40 mg of platinum per square centimeter of the coating.

110. The apparatus of any one of embodiments 1 to 33 or any embodiment dependent thereon, wherein the electrochemical reactor is operable to generate arsine gas at a pressure greater than or equal to 1 psig.

111. The method of embodiment 73 or 74 or any embodiment dependent on embodiment 73 or 74, wherein the electrically conductive substrate of the hydrogen oxidation anode comprises carbon paper, carbon cloth, platinum coated titanium mesh, platinum mesh, palladium mesh, and/or nickel mesh.

112. The method of embodiment 72 or any embodiment dependent on embodiment 72, wherein the hydrogen oxidation anode comprises carbon cloth or carbon paper and a coating of a dispersed platinum catalyst on the carbon cloth or carbon paper.

113. The method of embodiment 112, wherein the coating has a loading of about 0.05 to about 40 mg of platinum per square centimeter of the coating.

114. An electrochemical apparatus for generation of hydride gas, comprising:
an electrochemical reactor having a pressure vessel having an interior containing a cathode, an anode, and an electrolyte, wherein the cathode includes a first amount of an electrically conductive precursor material that is reducible to form the hydride gas; and
a gas tight filter external of and fluidly connected to the pressure vessel, the apparatus being operable to circulate the electrolyte through the filter to purify the electrolyte of electrochemical by-products.

115. The apparatus of embodiment 114, also comprising a pump configured to power the circulation of the electrolyte through the filter.

116. The apparatus of embodiment 115, also comprising a one-way valve, optionally of the pump, configured to prevent backflow of the electrolyte to the vessel during the circulation.

117. The apparatus of any one of embodiments 114 to 116, wherein the conductive precursor material is in particulate form, and wherein the cathode includes a packed bed of particles of the conductive precursor material.

118. The apparatus of any one of embodiments 114 to 117, also including an additional feature as specified in any one of the above-enumerated apparatus embodiments.

119. A method of generating a hydride gas, comprising generating the hydride gas with an apparatus of any one of embodiments 114 to 118.

Persons skilled in the relevant field will understand that these enumerated embodiments can be combined with one additional feature or multiple additional features (e.g. 2, 3 or 4 additional features) set forth in the descriptions above to arrive at further embodiments disclosed herein.

CITATION OF REFERENCES

U.S. Patent Documents

U.S. Pat. No. 3,109,785 November 1963 Gordon
U.S. Pat. No. 3,109,795 November 1963 Gordon
U.S. Pat. No. 3,262,871 July 1966 Miller et al.
U.S. Pat. No. 3,337,443 August 1967 Raetzch et al.
U.S. Pat. No. 3,404,076 October 1968 Haycock et al.
U.S. Pat. No. 4,178,224 December 1979 Porter
U.S. Pat. No. 5,158,656 October 1992 Ayers
U.S. Pat. No. 5,425,857 June 1995 Bouard et al.
U.S. Pat. No. 5,573,334 November 1996 Andersen
U.S. Pat. No. 5,925,232 July 1999 Ayers
U.S. Pat. No. 6,080,297 June 2000 Ayers

LITERATURE

W. V. Lloyd, "The Overpotential of Arsenic and the Yields of Arsine at an Arsenic Cathode in Acid Solutions," Transactions of the Faraday Society, Vol. XXVI, pp. 15-18 (1930). No month H. W. Slazberg and B. Goldschmidt, "Arsine Evolution and Water Reduction at an Arsenic Cathode," J. Electrochem. Soc. Vol. 107, No. 4, pp. 348-353 (1960).

N. Mahmood, Y. Yao, J-W. Zhang, L. Pan, X. Zhang, and J. Zou, "Electrocatalysts for Hydrogen Evolution in Alkaline Electrolytes", Adv. Sci. Vol. 5, p. 1700464 (2018).

U.S. OSHA, Permissible Exposure Limits, Arsine 50 ppb, CFR 1910.1000 Z-1 Table [58 FR 35340, Jun. 30, 1993

"Extremely Hazardous Chemicals Threshold Planning Quantities", U.S. EPA SARA Section 302, Arsine TPQ Storage limits, EPA 550-B-10-001, p. 26, March 2012.

The uses of the terms "a" and "an" and "the" and similar references herein (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the products or methods defined by the claims.

While embodiments of the disclosure have been illustrated and described in detail in the drawings and foregoing description, the same is to be considered as illustrative and not restrictive in character, it being understood that only some embodiments have been shown and described and that all changes and modifications that come within the spirit of the disclosures herein are desired to be protected. In addition, all references cited herein are indicative of the level of skill in the art and are hereby incorporated by reference in their entirety.

What is claimed is:

1. An electrochemical apparatus for generation of hydride gas, comprising:
   an electrochemical reactor having a pressure vessel having an interior containing a cathode, an anode, and an electrolyte, wherein the cathode includes a first amount of an electrically conductive precursor material that is reducible to form the hydride gas;
   wherein the conductive precursor material is in particulate form, and wherein the cathode includes a packed bed of particles of the conductive precursor material; and
   wherein (i) a bottom of the packed bed is spaced from and faces a top surface of the anode, the electrolyte contacts and spans between the bottom of the packed bed and the top surface of the anode, the reactor is configured to conduct current through the electrolyte between the bottom of the packed bed and the top surface of the anode, and the bottom of the packed bed and the top surface of the anode together form an electrochemical reaction cross-section area of the reactor, and (ii) the packed bed and anode are arranged such that at least 80% by weight of the particles of the packed bed can be consumed during generation of the hydride gas by the apparatus without changing the electrochemical reaction cross-section area of the reactor.

2. The apparatus of claim 1, also comprising a controller operable to control generation of the hydride gas and maintain a flow rate and pressure of the generated hydride gas.

3. The apparatus of claim 1, also comprising a gas manifold and tubing connected to the pressure vessel for delivering the hydride gas to a semiconductor fabrication reactor.

4. The apparatus of claim 1, wherein the conductive precursor material is a metallic precursor material.

5. The apparatus of claim 1, also comprising cathode current collectors immersed in the packed bed, the current collectors configured to allow movement of the conductive precursor material in the packed bed as it is consumed.

6. The apparatus of claim 5, wherein the cathode current collectors are positioned above a level of the electrolyte in the packed bed and within a dry section of the packed bed above said level.

7. The apparatus of claim 6, wherein the cathode current collectors are configured as a three dimensional, perforated metal grid.

8. The apparatus of claim 7, wherein the grid has grid dimensions larger than the dimensions of the particles of the packed bed.

9. The apparatus of claim 1, wherein a cross sectional area of the bottom of the packed bed remains constant as the conductive precursor material is consumed during generation of the hydride gas.

10. The apparatus of claim 9, wherein the bottom of the packed bed is spaced a first distance from the top surface of the anode, and wherein the value of the first distance divided by the cross-sectional area of the packed bed is in the range of 0.0004 to about 0.002.

11. The apparatus of claim 1, also comprising a non-electrically conducting perforated plate supporting the packed bed.

12. The apparatus of claim 11, also comprising a separator material that is permeable to the electrolyte or electrolyte ions positioned between the perforated plate and the surface of the anode.

13. The apparatus of claim 1, wherein the electrically conductive precursor material comprises arsenic, germanium, antimony, or phosphorous.

14. The apparatus of claim 1, wherein the anode comprises a hydrogen oxidation anode.

15. The apparatus of claim 14, wherein the hydrogen oxidation anode comprises a dispersed metal catalyst coated on a gas permeable, electrically conductive substrate.

16. The apparatus of claim 15, wherein the dispersed metal catalyst comprises platinum, ruthenium, nickel, copper, and/or cobalt.

17. The apparatus of claim 14, wherein the hydrogen oxidation anode comprises carbon cloth and a coating of a dispersed platinum catalyst on the carbon cloth.

18. The apparatus of claim 1, also comprising a gas tight filter external of and fluidly connected to the pressure vessel, the apparatus being operable to circulate the electrolyte through the filter to purify the electrolyte of electrochemical by-products.

19. The apparatus of claim 1, also comprising cathode current collectors extending downwardly into the packed bed, the current collectors configured to maintain electrical contact with and allow gravity-assisted downward movement of the conductive precursor material in the packed bed as the conduct precursor material is consumed to form the hydride gas.

20. The apparatus of claim 19, wherein the packed bed and anode are arranged such that at least 95% by weight of the particles of the packed bed can be consumed during generation of the hydride gas by the apparatus without changing the electrochemical reaction cross-section area of the reactor.

21. The apparatus of claim 19, wherein the current collectors have lowermost ends positioned in a dry region of the packed bed above a level of the electrolyte.

22. The apparatus of claim 19, wherein the bottom of the packed bed is spaced a first distance from the top surface of the anode, and wherein the value of the first distance divided by the cross-sectional area of the packed bed is in the range of 0.0004 to about 0.002.

23. The apparatus of claim 1, wherein the packed bed and anode are arranged such that at least 90% by weight of the particles of the packed bed can be consumed during generation of the hydride gas by the apparatus without changing the electrochemical reaction cross-section area of the reactor.

24. A method for generating a hydride gas, comprising:
 providing an electrochemical apparatus according to claim 1; and
 conducting electrical current between the cathode and the anode, said conducting causing electrochemical reduction of the electrically conductive precursor material to form the hydride gas and thereby consumption of amounts of the electrically conductive precursor material.

\* \* \* \* \*